US010276191B2

(12) United States Patent
Cho et al.

(10) Patent No.: US 10,276,191 B2
(45) Date of Patent: Apr. 30, 2019

(54) SPEECH SECTION DETECTION DEVICE, VOICE PROCESSING SYSTEM, SPEECH SECTION DETECTION METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Kenta Cho, Kawasaki Kanagawa (JP); Toshiyuki Kano, Kawasaki Kanagawa (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 287 days.

(21) Appl. No.: 15/263,520

(22) Filed: Sep. 13, 2016

(65) Prior Publication Data
US 2016/0379673 A1 Dec. 29, 2016

Related U.S. Application Data

(63) Continuation of application No. PCT/JP2015/063533, filed on May 11, 2015.

(30) Foreign Application Priority Data

Jul. 30, 2014 (JP) .................. 2014-155522

(51) Int. Cl.
*G10L 21/00* (2013.01)
*G10L 25/93* (2013.01)
(Continued)

(52) U.S. Cl.
CPC .............. *G10L 25/93* (2013.01); *G10L 25/78* (2013.01); *G10L 15/30* (2013.01); *G10L 2025/786* (2013.01)

(58) Field of Classification Search
CPC ....................................................... G10L 21/00
(Continued)

(56) References Cited

U.S. PATENT DOCUMENTS 6,094,632 A * 7/2000 Hattori .................... G10L 17/24
379/88.01
7,406,413 B2 * 7/2008 Geppert .................. G10L 15/26
379/88.01
(Continued)

FOREIGN PATENT DOCUMENTS

JP 09-120293 5/1997
JP 2002-049390 2/2002
(Continued)

OTHER PUBLICATIONS

International Search Report for International Patent Application No. PCT/JP2015/063533 dated Jul. 28, 2015, 7 pages.
(Continued)

*Primary Examiner* — Michael C Colucci
(74) *Attorney, Agent, or Firm* — Amin, Turocy & Watson LLP

(57) ABSTRACT

According to an embodiment, a speech section detection device includes a reception unit and a detection unit. The reception unit is configured to receive, from an external device, a first voice signal that is a signal in which likelihood indicating a probability of speech is equal to or more than a first threshold. The detection unit is configured to detect, from the first voice signal, a second voice signal that is a signal of a section in which the likelihood is equal to or more than a second threshold that is larger than the first threshold.

12 Claims, 7 Drawing Sheets

(51) Int. Cl.
*G10L 25/78* (2013.01)
*G10L 15/30* (2013.01)

(58) Field of Classification Search
USPC ..... 704/500, 253, 247, 246, 243; 379/88.01; 382/100
See application file for complete search history.

(56) References Cited

U.S. PATENT DOCUMENTS

| | | | | |
|---|---|---|---|---|
| 7,813,924 | B2* | 10/2010 | Nurminen | G10L 15/04 704/210 |
| 8,543,402 | B1* | 9/2013 | Ma | G10L 17/08 704/243 |
| 9,661,145 | B2* | 5/2017 | Gilg | H04M 3/56 |
| 2006/0100869 | A1* | 5/2006 | Thomas | G10L 15/02 704/243 |
| 2007/0021958 | A1* | 1/2007 | Visser | G10L 21/0272 704/226 |
| 2007/0061147 | A1 | 3/2007 | Monne et al. | |
| 2009/0063150 | A1* | 3/2009 | Nasukawa | G10L 15/26 704/253 |
| 2010/0114572 | A1* | 5/2010 | Tani | G10L 17/08 704/247 |
| 2011/0071830 | A1* | 3/2011 | Kim | G01C 21/3602 704/246 |
| 2013/0013307 | A1* | 1/2013 | Bodin | H04L 29/06027 704/235 |
| 2013/0066641 | A1* | 3/2013 | Bruhn | H04M 3/569 704/500 |

FOREIGN PATENT DOCUMENTS

| | | |
|---|---|---|
| JP | 2005-012377 | 1/2005 |
| JP | 2005-091611 | 4/2005 |
| JP | 2005-331616 | 12/2005 |
| JP | 2007-199552 | 8/2007 |
| JP | 2007-235969 | 9/2007 |
| JP | 2008-134565 | 6/2008 |

OTHER PUBLICATIONS

Written Opinion for International Patent Application No. PCT/JP2015/063533 dated Jul. 28, 2015, 4 pages.

* cited by examiner

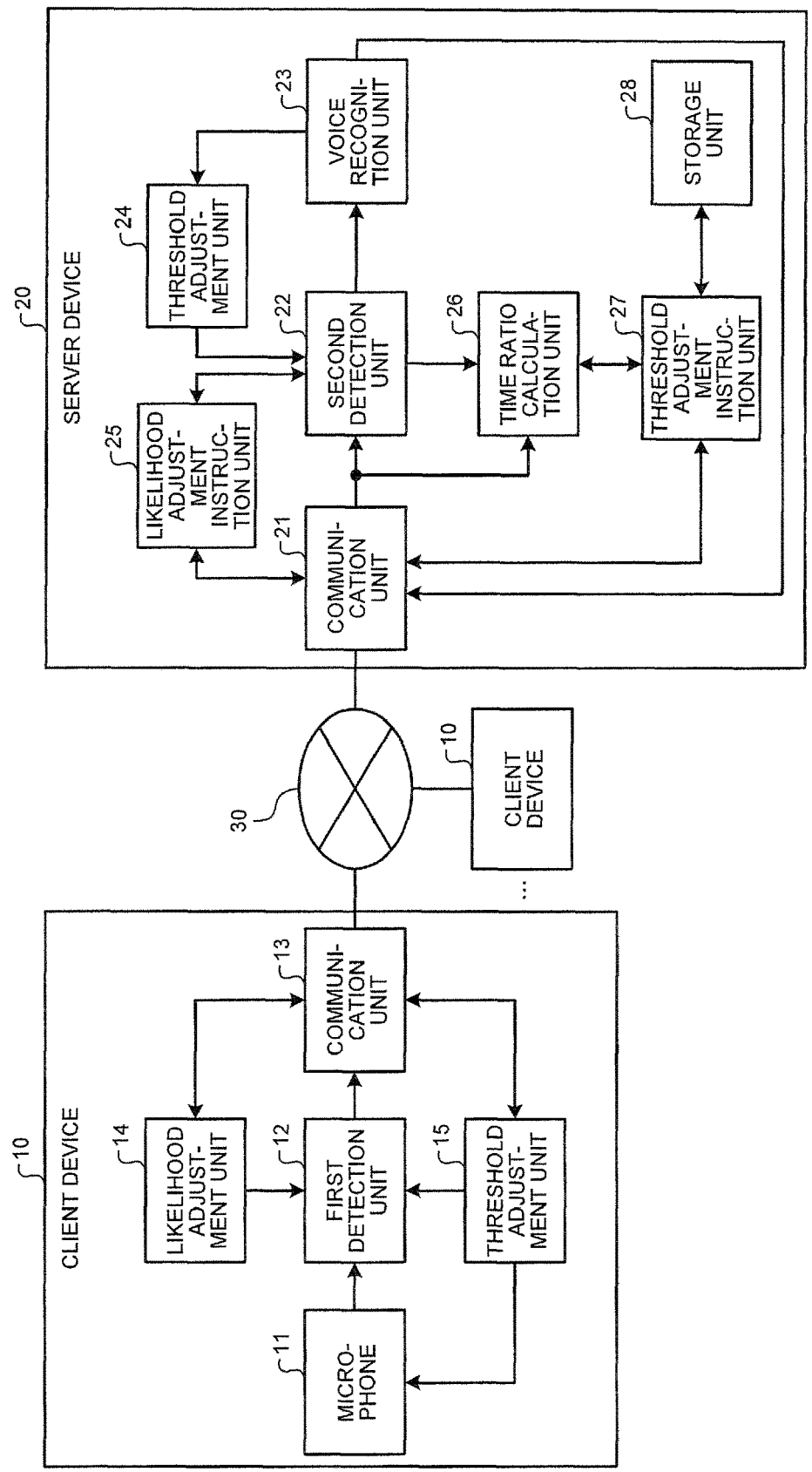

SPEECH SECTION DETECTION DEVICE, VOICE PROCESSING SYSTEM, SPEECH SECTION DETECTION METHOD, AND COMPUTER PROGRAM PRODUCT

CROSS-REFERENCE TO RELATED APPLICATIONS

This application is a continuation of PCT international application Ser. No. PCT/JP2015/063533 filed on May 11, 2015, and which claims the benefit of priority from Japanese Patent Application No. 2014-155522, filed on Jul. 30, 2014; the entire contents of which are incorporated herein by reference.

FIELD

Embodiments described herein relate generally to a speech section detection device, a voice processing system, a speech section detection method, and a computer program product.

BACKGROUND

There has been known a server-client type voice recognition system that transmits a signal including voice (human speech) from a client device to a server device, and that returns a recognition result to the client device after performing voice recognition in the server device. In this type of voice recognition system, to reduce the communication volume from the client device to the server device, a process has been developed that detects a section of voice (hereinafter, referred to as a speech section) from a signal received by the client side, and only transmits a signal in the detected speech section to the server device.

In detecting the speech section in the client device, it is difficult to accurately detect the speech section, because resources of the client device are limited compared to those of the server device. Furthermore, because the voice state of the client side differs according to the environment and changes often, there is a possibility of not being able to collect spoken voice. Consequently, there is a demand for accurately detecting the speech section while reducing the communication volume.

BRIEF DESCRIPTION OF THE DRAWINGS

FIG. 1 is a block diagram illustrating a configuration example of a voice recognition system of an embodiment;

DETAILED DESCRIPTION

Figure 2A:
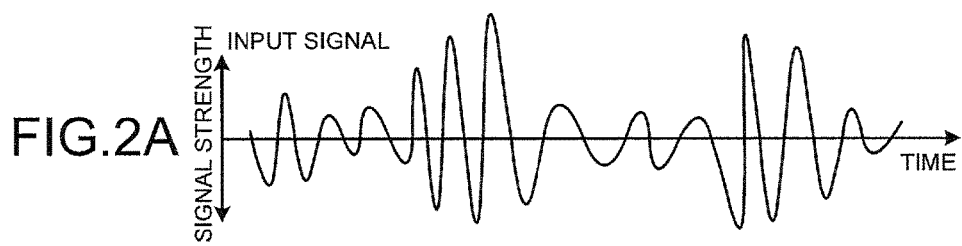
FIG. 2A to FIG. 2C are diagrams for explaining an example of a process performed by a first detection unit.

According to an embodiment, a speech section detection device includes a reception unit and a detection unit. The reception unit is configured to receive, from an external device, a first voice signal that is a signal in which likelihood indicating a probability of speech is equal to or more than a first threshold. The detection unit is configured to detect, from the first voice signal, a second voice signal that is a signal of a section in which the likelihood is equal to or more than a second threshold that is larger than the first threshold.

Embodiments will be described in detail below with reference to the accompanying drawings. The following embodiments are applied to a server-client type voice recognition system in which a server device performs a voice recognition on a signal that is received from a client device, and returns the recognition result to the client device. However, the system to which the present embodiment can be applied is not limited thereto.

First Embodiment

FIG. 1 is a block diagram illustrating a configuration example of a voice recognition system according to the present embodiment. The voice recognition system has a configuration in which a plurality of client devices 10 (first device, external device) and a server device 20 (second device, speech section detection device) are communicably connected via a communication network 30. In the voice recognition system, the client device 10 roughly detects a speech section in the signal being received, and transmits a signal (hereinafter, referred to as a first voice signal) of a section that may include speech, to the server device 20. The server device 20 then strictly detects the speech section in the first voice signal that is received from the client device 10, performs a voice recognition on the signal (hereinafter, referred to as a second voice signal) of the section that is most likely speech, and transmits text data of the recognition result to the client device 10. In this manner, it is possible to implement highly accurate and efficient voice recognition that accurately detects the speech section, while reducing the communication volume between the client device 10 and the server device 20.

As illustrated in FIG. 1, the client device 10 includes a microphone 11, a first detection unit 12, a communication unit 13 (transmission unit), a likelihood adjustment unit 14, and a threshold adjustment unit 15. For example, the client device 10 may be a personal computer that has an external connection terminal connected to an external microphone, a smartphone with a built-in microphone, a tablet terminal, a television conference terminal that is configured as a terminal for a television conference (video conference) system, and the like. These devices have resources to implement a normal computer system such as a processor and memory. For example, by executing predetermined programs on the computer system, it is possible to implement the functional components such as the first detection unit 12, the communication unit 13, the likelihood adjustment unit 14, the threshold adjustment unit 15, and the like.

The microphone 11 receives a signal including human speech (voice). The signal received by the microphone 11 (hereinafter, referred to as an input signal) is passed to the first detection unit 12. In the present embodiment, the client device 10 receives a signal by using the microphone 11. However, the input signal may also be a signal that the client device 10 receives from an external device, or a signal that is read out from recording media and the like.

The first detection unit 12 detects a speech section in the input signal, using a method with a relatively small arithmetic processing load. In the present embodiment, the first detection unit 12 detects the speech section, based on the signal strength of the input signal. Specifically, the first detection unit 12 uses the signal strength of the input signal received by the microphone 11 as a feature amount for the speech section detection, and calculates, for the input signal, likelihood indicating a value that increases with the increase in the signal strength in a time series manner. The likelihood to be calculated in this example is a value that indicates the probability of human speech, and is normalized so that the maximum value is one and the minimum value is zero, for example. The first detection unit 12 then detects a section in which the likelihood is equal to or more than a first threshold in the input signal as a speech section, and outputs the signal in the section as the first voice signal.

Figure 2B:
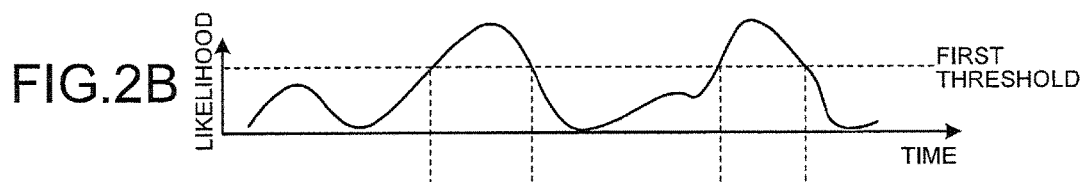
Figure 2C:
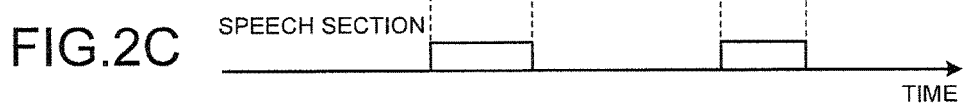

FIG. 2A to FIG. 2C are diagrams for explaining an example of a process performed by the first detection unit 12. FIG. 2A is a graph of linear pulse code modulation (PCM) sampling data (input signal) received by the microphone 11, and the horizontal axis represents the time and the vertical axis represents the signal strength. FIG. 2B is a graph illustrating the time-series of the likelihood that is calculated from the input signal in FIG. 2A. FIG. 2C indicates a speech section that is detected by comparing the likelihood in FIG. 2B with the first threshold. In the graph in FIG. 2A, the amplitude represents the signal strength, and the signal strength increases with the increase in the amplitude. The likelihood in FIG. 2B is a waveform that is obtained by normalizing the average value of the signal strength per predetermined time, and approximating those values plotted on the time axis by a curve.

As illustrated in FIG. 2A to FIG. 2C, the first detection unit 12 calculates, for the input signal, the likelihood the value of which increases with the increase in the signal strength (first method). The first detection unit 12 then detects a section in which the likelihood is equal to or more than the first threshold, in the input signal, as the speech section. The first threshold is initialized to a small value (such as 0.1) that is still capable of collecting voice from the input signal, and is suitably adjusted based on the instruction from the server device 20, which will be described below. By using the first threshold, the first detection unit 12 detects a section that is estimated to include the human speech (voice) in the input signal, as the speech section. The likelihood that the first detection unit 12 calculates for the input signal is adjusted, so as to match with the likelihood that is to be calculated at the server device 20 side, which will be described below.

The communication unit 13 transmits and receives various types of information to and from the server device 20 via the communication network 30. For example, the communication unit 13 transmits the first voice signal that is a signal of the section that the first detection unit 12 has detected as the speech section, to the server device 20. The communication unit 13 also receives text data as the recognition result of a voice recognition, an instruction for adjusting the likelihood, an instruction for adjusting the threshold, an instruction for adjusting the sensitivity of the microphone 11, and the like, which will be described below, that are transmitted from the server device 20.

The likelihood adjustment unit 14 adjusts the likelihood that the first detection unit 12 calculates for the input signal, based on the instruction for adjusting the likelihood received from the server device 20. A specific example of the process performed by the likelihood adjustment unit 14 will be described in detail below with the explanation of the process in the server device 20.

The threshold adjustment unit 15 adjusts the first threshold that is used for detecting the speech section by the first detection unit 12, based on the instruction for adjusting the threshold received from the server device 20. The threshold adjustment unit 15 also has a function of adjusting the sensitivity of the microphone 11, when the instruction for adjusting the sensitivity of the microphone 11 is transmitted from the server device 20, based on the instruction for adjusting the sensitivity. A specific example of the process performed by the threshold adjustment unit 15 will be described in detail below with the explanation of the process in the server device 20.

As illustrated in FIG. 1, the server device 20 includes a communication unit 21 (reception unit), a second detection unit 22 (detection unit), a voice recognition unit 23, a threshold adjustment unit 24, a likelihood adjustment instruction unit 25, a time ratio calculation unit 26, a threshold adjustment instruction unit 27, and a storage unit 28.

The communication unit 21 transmits and receives various types of information to and from the client device 10 via the communication network 30. For example, the communication unit 21 receives the first voice signal and a threshold inquiry that are transmitted from the client device 10. The communication unit 21 also transmits text data as the recognition result of the voice recognition unit 23, an instruction for adjusting the likelihood from the likelihood adjustment instruction unit 25, an instruction for adjusting the threshold from the threshold adjustment instruction unit 27, and an instruction for adjusting the sensitivity of the microphone 11, to the client device 10.

The second detection unit 22 strictly detects the speech section in the first voice signal received from the client device 10, using a method with an arithmetic processing load larger than that of the speech section detection performed by the first detection unit 12 in the client device 10. For example, by using the feature amount that is calculated from the frequency characteristics of voice, an acoustic model, and the like, the second detection unit 22 calculates the likelihood in the first voice signal in a time series manner (second method). The second detection unit 22 then detects a section in which the likelihood is equal to or more than a second threshold in the first voice signal, as the speech section, and outputs the signal in the section as the second voice signal. To strictly detect the speech section, the second threshold is initialized to a value (such as 0.3) larger than the first threshold that is set by the first detection unit 12 of the client device 10. Then, the threshold adjustment unit 24 suitably adjusts the second threshold, according to the recognition result of the voice recognition unit 23, which will be described later.

Figure 3A:
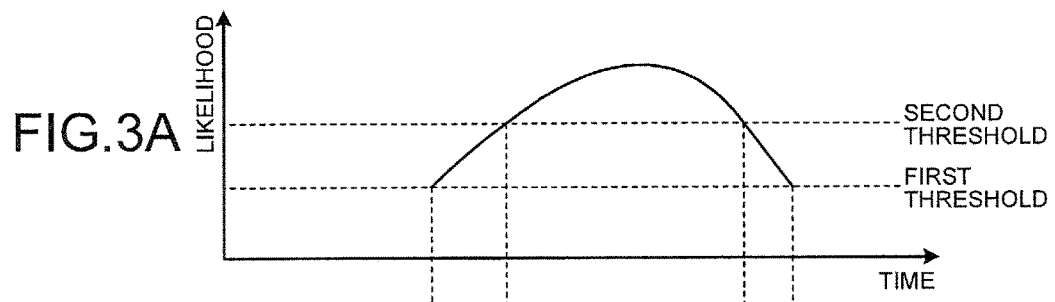
FIG. 3A and FIG. 3B are diagrams for schematically explaining a process performed by a second detection unit.
Figure 3B:
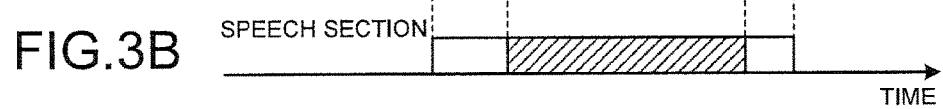

FIG. 3A and FIG. 3B are diagrams for schematically explaining a process performed by the second detection unit 22. FIG. 3A is a graph illustrating the time change in the likelihood that is calculated from the first voice signal. FIG. 3B is a diagram illustrating a speech section (hatched portion) that is detected by comparing the likelihood in FIG. 3A with the second threshold. As illustrated in FIG. 3A and FIG. 3B, the second detection unit 22 detects the section in which the likelihood that is calculated from the first voice signal in a time series manner is equal to or more than the second threshold, which is larger than the first threshold, as the speech section. The second detection unit 22 then passes the second voice signal that is the signal in the detected speech section, to the voice recognition unit 23.

The speech section detection using the feature amount calculated from the frequency characteristics of voice, an acoustic model, or the like requires more computer resources than the simple speech section detection performed by the first detection unit 12 of the client device 10, but can detect the speech section more accurately. By detecting the section in which the likelihood that is calculated from the first voice signal is equal to or more than the second threshold, which is larger than the first threshold, as the speech section, it is possible to detect the speech section more accurately.

For example, the voice recognition unit 23 outputs text data corresponding to the second voice signal, by performing the voice recognition on the second voice signal, using an acoustic model, a linguistic model, or the like. In the voice recognition executed by the voice recognition unit 23, a known technique can be used as it is. Thus, the detailed description thereof will be omitted. The text data as the recognition result is transmitted from the communication unit 21 to the client device 10. The text data is then displayed on a display unit, which is not illustrated, of the client device 10.

For example, the voice recognition system of the present embodiment may be used in an application in which information is shared among a plurality of client devices 10, such as in a television conference with the other bases and in a group call. In such a case, the server device 20 transmits screen information in which text data as the recognition result of the voice recognition described above is integrated, or the like, to each of the client devices 10 that shares the information. Consequently, it is possible to display a screen in which the text data of the recognition result obtained by performing the voice recognition on the speech of a plurality of speakers, on the display unit of the client devices 10.

The threshold adjustment unit 24 adjusts the second threshold that is used when the second detection unit 22 detects the speech section, based on the recognition result of the voice recognition unit 23. The voice recognition unit 23 converts the speech included in the second voice signal into text data, by not only acoustically analyzing the second voice signal using the acoustic model, but also by linguistically analyzing the second voice signal. The linguistic analysis analyzes whether the signal is formed as speech, by using the linguistic model. Consequently, the voice recognition performed by the voice recognition unit 23 can be regarded to detect the speech section further accurately than the second detection unit 22. In other words, it is possible to know whether the second detection unit 22 is accurately detecting the speech section, from the recognition result of the voice recognition unit 23.

The threshold adjustment unit 24 adjusts the second threshold so as to increase the detection accuracy of the speech section by the second detection unit 22, based on the recognition result of the voice recognition unit 23. More specifically, when it is determined that the second voice signal is a signal in which the speech is interrupted in the middle, from the recognition result of the voice recognition, the threshold adjustment unit 24 adjusts the second threshold by reducing the second threshold. When it is determined that the second voice signal is a signal including many non-speech portions, the threshold adjustment unit 24 adjusts the second threshold, by increasing the second threshold. In this manner, the second detection unit 22 can further accurately detect the speech section from the first voice signal.

The likelihood adjustment instruction unit 25 instructs the client device 10 to adjust the likelihood so that the likelihood calculated by the first detection unit 12 of the client device 10 approximates the likelihood calculated by the second detection unit 22.

In the voice recognition system of the present embodiment, the client device 10 roughly detects the speech section, and the server device 20 strictly detects the speech section. Consequently, it is possible to implement highly accurate and efficient voice recognition that accurately detects the speech section, while reducing the communication volume between the client device 10 and the server device 20. Hence, the second threshold used in the speech section detection by the server device 20 is larger than the first threshold used in the speech section detection by the client device 10. However, the method of calculating the likelihood from the input signal performed by the first detection unit 12 of the client device 10 is different from the method of calculating the likelihood from the first voice signal performed by the second detection unit 22 of the server device 20. Thus, the likelihood calculated by the first detection unit 12 and the likelihood calculated by the second detection unit 22 for the same signal need to be adjusted, so as to become substantially the same.

The likelihood adjustment instruction unit 25 instructs the client device 10 to adjust the likelihood so that the likelihood calculated by the first detection unit 12 of the client device 10 approximates the likelihood calculated by the second detection unit 22, for example, by using the following process. The likelihood adjustment unit 14 of the client device 10 then adjusts the likelihood to be calculated by the first detection unit 12, based on the instruction from the likelihood adjustment instruction unit 25.

Specifically, the likelihood adjustment instruction unit 25 first requests the second detection unit 22 to calculate the likelihood, by passing a sampled signal stored in advance to the second detection unit 22. The likelihood adjustment instruction unit 25 then acquires time series data of the likelihood that the second detection unit 22 has calculated from the sampled signal, using the method described above. The sampled signal includes a section of human speech and a section of silence. The likelihood to be calculated by the second detection unit 22 may be normalized in advance so that the maximum value is one, and the minimum value is zero. Alternatively, the maximum value and the minimum value of the time series data of the likelihood that are calculated from the sampled signal may be adjusted to one and zero, respectively.

When the client device 10 is connected to the server device 20, the likelihood adjustment instruction unit 25 transmits a sampled signal stored in advance and the time series data of the likelihood that the second detection unit 22 has calculated from the sampled signal, to the client device 10 that is connected to the server device 20. The likelihood adjustment instruction unit 25 then instructs the client device 10 to adjust the likelihood so that the likelihood that the first detection unit 12 calculates for the transmitted sampled signal in a time series manner using the method described above approximates the transmitted time-series data.

In the client device 10 that has received the sampled signal, the time-series data of the likelihood, and the instruction for adjusting the likelihood from the server device 20, the likelihood adjustment unit 14 adjusts the likelihood calculated by the first detection unit 12, based on the instruction for adjusting the likelihood that is received from the server device 20. More specifically, the likelihood adjustment unit 14 requests the first detection unit 12 to calculate the likelihood, by passing the sampled signal received from the server device 20 to the first detection unit 12. At this time, the likelihood adjustment unit 14 requests the first detection unit 12 to calculate the likelihood, while changing parameters for calculating the likelihood a plurality of times. In this example, the parameters for calculating the likelihood are formulas and tables of the likelihood with respect to the signal strength of the input signal, for example.

The likelihood adjustment unit 14 acquires the time series data on a plurality of pieces of likelihood corresponding to each of the parameters being changed, from the first detection unit 12, and compares each of the time series data of the pieces of likelihood, with the time series data received from the server device 20. The likelihood adjustment unit 14 then specifies the time series data that is most similar to the time series data received from the server device 20, and instructs the first detection unit 12 to use the parameter corresponding to this time series data, as the parameter for calculating the likelihood. By performing the above process, the likelihood that is calculated by the first detection unit 12 is adjusted, so as to approximate the likelihood that is calculated by the second detection unit 22.

To adjust the likelihood while taking into account the influence of the microphone 11, the environment, or the like, a sampled signal reproduced by an external sound player may be received by the microphone 11, and the first detection unit 12 may calculate the likelihood of the sampled signal received by the microphone 11. In this case, the user of the client device 10 may download the sampled signal from the server device 20, and reproduce the downloaded sampled signal by the external sound player, while operating the client device 10.

Figure 4A:
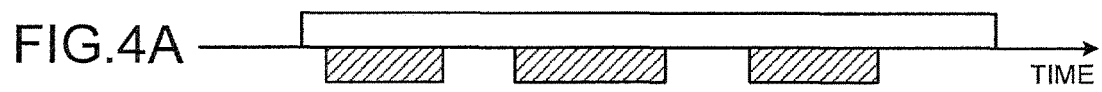
FIG. 4A to FIG. 4C are diagrams for explaining time ratio.
Figure 4B:
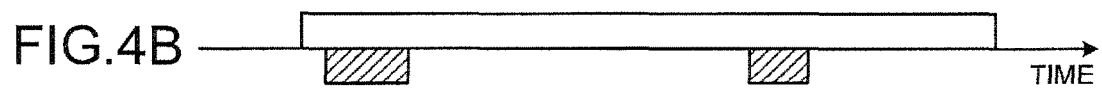
Figure 4C:
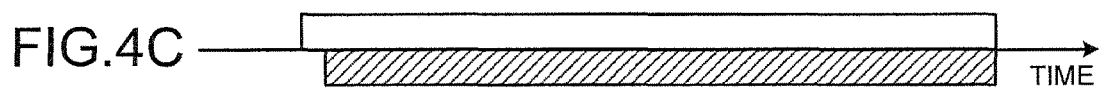

The time ratio calculation unit 26 calculates the time ratio between the first voice signal that is received from the client device 10, and the second voice signal that is a signal in the speech section that the second detection unit 22 has detected from the first voice signal. FIG. 4A to FIG. 4C are diagrams for explaining time ratio. In FIG. 4A to FIG. 4C, the horizontal axis represents time, the outlined rectangular shape represents the time length of the first voice signal, and the hatched rectangular shape represents the time length of the second voice signal. The time ratio is a ratio of the time length of the second voice signal (speech section detected by the second detection unit 22 of the server device 20) relative to the time length of the first voice signal (speech section detected by the first detection unit 12 of the client device 10).

FIG. 4A is an example in which the time ratio is within a proper range, and the client device 10 and the server device 20 are operating as expected. In other words, when the time ratio is as in FIG. 4A, it is assumed that the relation between the speech section detection that is roughly performed by the client device 10, and the speech section detection that is strictly performed by the server device 20 is as expected.

FIG. 4B is an example in which the time length of the second voice signal is too short relative to the time length of the first voice signal, and the time ratio is smaller than the proper range. When the first detection unit 12 of the client device 10 is detecting a section containing an excessive amount of non-speech portions in the input signal, as the speech section, the time ratio becomes as in FIG. 4B. When the time ratio is as in FIG. 4B, the first voice signal that contains the excessive amount of non-speech portions is transmitted from the client device 10 to the server device 20. Consequently, the communication volume is increased.

FIG. 4C is an example in which the time length of the second voice signal is too long relative to the time length of the first voice signal, and the time ratio is larger than the proper range. When the first detection unit 12 of the client device 10 is detecting the speech section too strictly, the time ratio becomes as in FIG. 4C. When the time ratio is as in FIG. 4C, there is a possibility that spoken voice cannot be completely collected from the input signal in the client device 10.

As described above, the time ratio between the first voice signal and the second voice signal is valuable information to determine whether the client device 10 and the server device 20 are operating as expected. Thus, the server device 20 of the present embodiment includes the time ratio calculation unit 26 for calculating the time ratio described above. The time ratio calculated by the time ratio calculation unit 26 is passed to the threshold adjustment instruction unit 27.

The threshold adjustment instruction unit 27 calculates a proper value of the first threshold that the first detection unit 12 of the client device 10 uses for detecting the speech section, based on the time ratio calculated by the time ratio calculation unit 26. The threshold adjustment instruction unit 27 then instructs the client device 10 to adjust the first threshold to the calculated proper value. For example, the instruction that the threshold adjustment instruction unit 27 sends to the client device 10 is sent as a response to a threshold inquiry from the client device 10. In other words, the threshold adjustment instruction unit 27 requests the time ratio calculation unit 26 to calculate the time ratio, corresponding to the threshold inquiry from the client device 10, and acquires the time ratio from the time ratio calculation unit 26. When the acquired time ratio is smaller than the proper range as in the example of FIG. 4B, the threshold adjustment instruction unit 27 calculates a value larger than the first threshold that is currently set in the client device 10, as the proper value. The threshold adjustment instruction unit 27 then instructs the client device 10 to adjust the first threshold, by transmitting the calculated proper value to the client device 10, as the return value of the inquiry. On the other hand, when the acquired time ratio is larger than the proper range as in the example of FIG. 4C, the threshold adjustment instruction unit 27 calculates a value smaller than the first threshold that is currently set in the client device 10, as the proper value. The threshold adjustment instruction unit 27 then instructs the client device 10 to adjust the first threshold, by transmitting the calculated proper value to the client device 10, as the return value of the inquiry.

In the client device 10 that has received the proper value of the first threshold and the instruction for adjusting the threshold from the server device 20, the threshold adjustment unit 15 changes the current first threshold that the first detection unit 12 uses for detecting the speech section, to the proper value received from the server device 20, based on the instruction from the server device 20. By repeating the above processes, the speech section that is detected by the first detection unit 12 is optimized in relation to the speech section that is detected by the second detection unit 22 of the server device 20.

Furthermore, the threshold adjustment instruction unit 27 has a function of storing the proper value of the first threshold that is calculated for the client device 10 in the storage unit 28, in association with attribute information of the client device 10. In this example, the attribute information is information indicating various conditions that may affect the speech section detection, such as the performance and usage environment of the client device 10, information on a user who uses the client device 10, and the like. Examples of the attribute information include the specifications of the hardware resources of the client device 10, a version of software such as an operation system, profile information of the client device 10 including the performance of the microphone 11, information on the usage environment when the client device 10 is fixedly used in a specific environment such as a meeting room, user information of the client device 10 that is associated with the account, and the like. For example, the attribute information such as the above is obtained from the client device 10, when the client device 10 is connected to the server device 20.

In this example, when the attribute information being acquired from the client device 10 when the client device 10 is connected to the server device 20, is similar to the attribute information of another client device 10 that is stored in the storage unit 28, the threshold adjustment instruction unit 27 may read out the proper value of the first threshold that is stored in the storage unit 28 in association with the attribute information. The threshold adjustment instruction unit 27 may then instruct the client device 10 that is connected to the server device 20, to set the proper value that has been read out from the storage unit 28 as an initial value of the first threshold. Consequently, compared to when the initial value of the first threshold is set to the fixed value, it is possible to set the initial value that is more adaptable to the performance and usage environment of the client device 10. Hence, even in the initial stage before the first threshold is adjusted, the first detection unit 12 can detect the speech section more properly.

Furthermore, when the proper value of the first threshold that is calculated based on the time ratio described above exceeds a reference range that is determined in advance between zero to one, the threshold adjustment instruction unit 27 may instruct the client device 10 to adjust the sensitivity of the microphone 11. For example, when the proper value of the first threshold that is calculated based on the time ratio is a value close to one, exceeding the reference range, it is assumed that the microphone 11 of the client device 10 is receiving a large amount of ambient noise other than speech. In such a case, the threshold adjustment instruction unit 27 instructs the client device 10 to reduce the sensitivity of the microphone 11. When the proper value of the first threshold that is calculated based on the time ratio is a value close to zero, exceeding the reference range, it is assumed that the microphone 11 of the client device 10 is not properly receiving sound. In such a case, the threshold adjustment instruction unit 27 instructs the client device 10 to increase the sensitivity of the microphone 11.

In the client device 10 that has received the instruction for adjusting the sensitivity of the microphone 11 from the server device 20, the threshold adjustment unit 15 adjusts the sensitivity of the microphone 11, based on the instruction from the server device 20. In this manner, the sensitivity of the microphone 11 is adjusted so as to adapt to the environment, and the first detection unit 12 can properly detect the speech section.

The threshold adjustment instruction unit 27 may also transmit a warning indicating that an input of the signal using the microphone 11 is not being properly performed, to the client device 10, in addition to the instruction for adjusting the sensitivity of the microphone 11 described above, or instead of the instruction for adjusting the sensitivity of the microphone 11. For example, when the proper value of the first threshold that is calculated based on the time ratio is a value close to one, exceeding the reference range, the threshold adjustment instruction unit 27 transmits a warning to inform the user that the microphone 11 is receiving a large amount of ambient noise other than the speech. The threshold adjustment instruction unit 27 also urges the user to use the microphone 11 in an environment with less noise. When the proper value of the first threshold that is calculated based on the time ratio is a value close to zero, exceeding the reference range, the threshold adjustment instruction unit 27 transmits a warning to inform the user that the microphone 11 is not properly receiving sound. The threshold adjustment instruction unit 27 also urges the user to change the microphone 11 to be used, to a microphone with higher performance. The client device 10 side that has received such a warning notifies the user by displaying the content of the warning on the display unit, which is not illustrated. Furthermore, the instruction for adjusting the sensitivity of the microphone 11 may be included in the warning, and the client device 10 may interpret the content of the warning and automatically adjust the sensitivity of the microphone 11.

Figure 5:
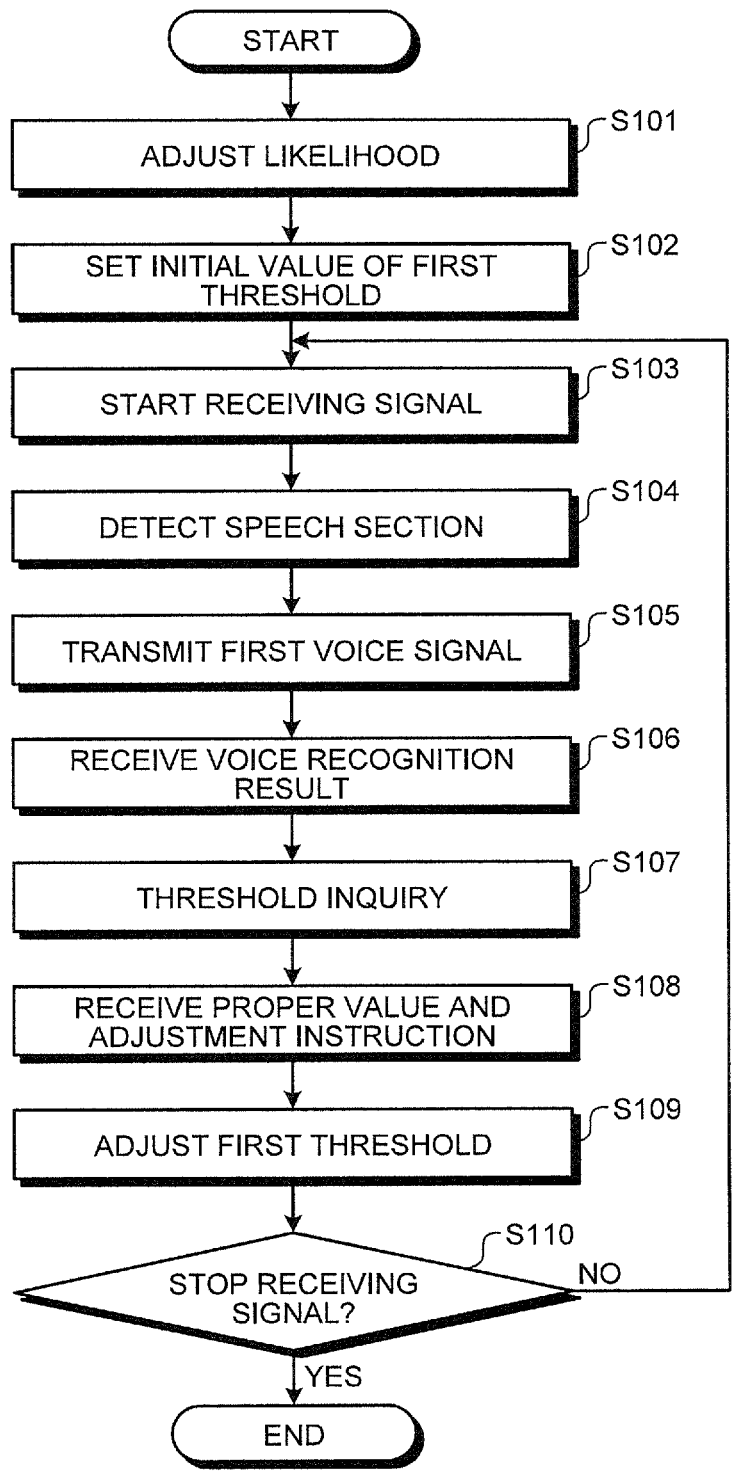
FIG. 5 is a flowchart illustrating an example of a processing procedure of a client device.

Next, an example of an operation performed by the voice recognition system according to the present embodiment will be described, by dividing the process into the processes performed by the client device 10 and the process performed by the server device 20. The processing flow in the client device 10 will now be described with reference to FIG. 5. FIG. 5 is a flowchart illustrating an example of a processing procedure of the client device 10.

A series of processes illustrated in the flowchart of FIG. 5 starts when the client device 10 is connected to the server device 20. When the process starts, for example, the likelihood adjustment unit 14 first adjusts the likelihood calculated by the first detection unit 12 using the above method, based on the instruction for adjusting the likelihood from the server device 20 (step S101).

Next, the first detection unit 12 sets an initial value of the first threshold to be used for detecting the speech section (step S102). As described above, the initial value of the first threshold may be a fixed value (such as 0.1) determined in advance, or a proper value of the first threshold that is calculated for another client device 10 with similar attribution information (such as profile information, information on the usage environment, and user information). Alternatively, the threshold adjustment unit 15 may set the initial value of the first threshold.

Next, the microphone 11 starts receiving a signal including voice (human speech) (step S103), and passes the input signal to the first detection unit 12. The first detection unit 12 detects the speech section in the input signal using the above method, for example (step S104). The first voice signal that is a signal in the speech section having been detected by the first detection unit 12 is transmitted to the server device 20 from the communication unit 13, via the communication network 30 (step S105).

When the voice recognition is performed in the server device 20 and the recognition result is transmitted, the recognition result is received by the communication unit 13 (step S106). The recognition result is then displayed on the display unit, which is not illustrated, of the client device 10.

Next, the threshold adjustment unit 15 performs a threshold inquiry to the server device 20 (step S107). The threshold inquiry is transmitted to the server device 20 from the communication unit 13, via the communication network 30. When a proper value of the first threshold and the adjustment instruction are transmitted from the server device 20 as the response to the threshold inquiry, the proper value and the adjustment instruction are received by the communication unit 13, and are passed to the threshold adjustment unit 15 (step S108). The threshold adjustment unit 15 then adjusts the first threshold, by changing the value of the first threshold that the first detection unit 12 uses for detecting the speech section, to the proper value that is received with the adjustment instruction, based on the adjustment instruction from the server device 20 (step S109).

While the microphone 11 is receiving the signal (No at step S110), the processes from step S103 to step S109 are repeated. When the microphone 11 stops receiving the signal (Yes at step S110), the series of processes illustrated in the flowchart of FIG. 5 are completed.

Figure 6:
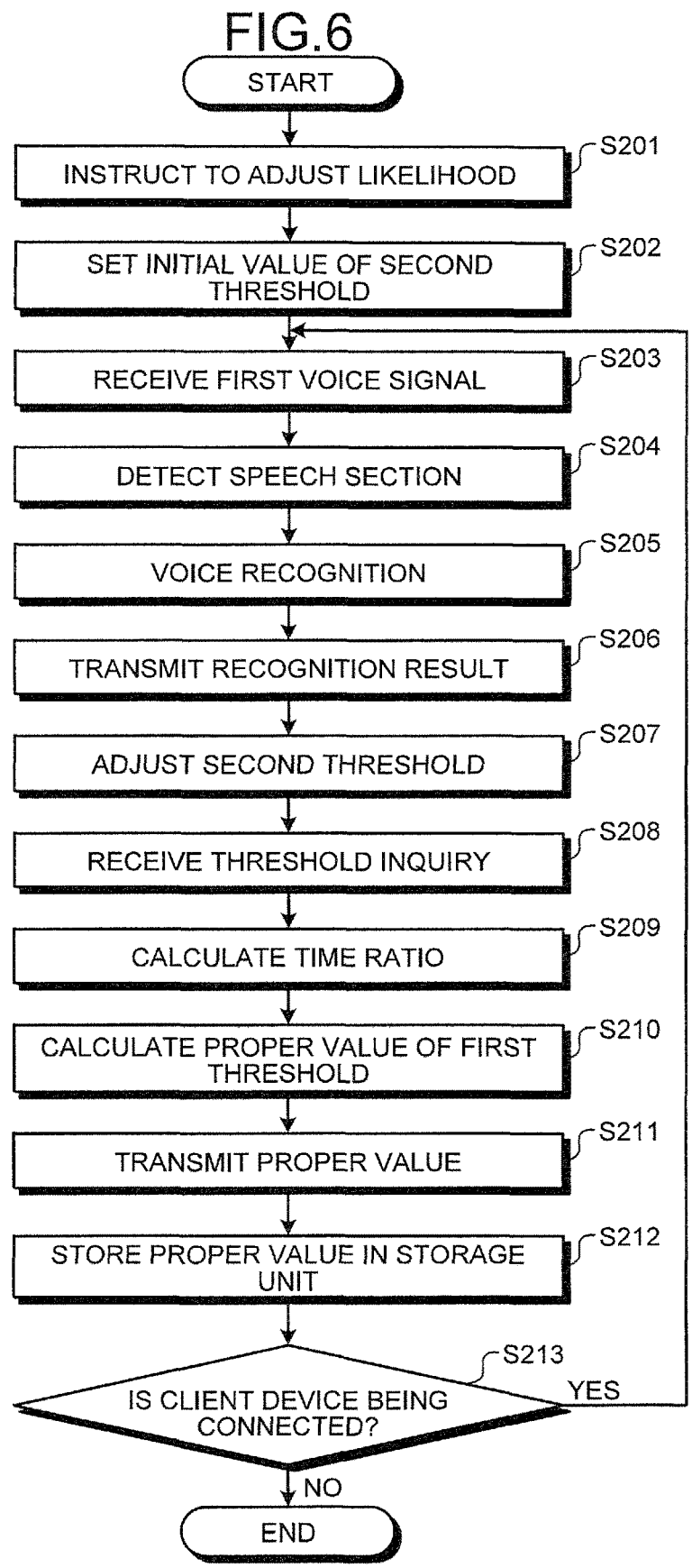
FIG. 6 is a flowchart illustrating an example of a processing procedure of a server device.

Next, a processing flow in the server device 20 will be described with reference to FIG. 6. FIG. 6 is a flowchart illustrating an example of a processing procedure of the server device 20. A series of processes described in the flowchart of FIG. 6 starts when the client device 10 is connected to the server device 20. When the client devices 10 are simultaneously connected to the server device 20, the server device 20 performs the process illustrated in the flowchart of FIG. 6, for each of the client devices 10.

When the process starts, the likelihood adjustment instruction unit 25 instructs the client device 10 to adjust the likelihood using the method described above, for example (step S201).

Next, the second detection unit 22 sets an initial value of the second threshold to be used for detecting the speech section (step S202). As described above, the initial value of the second threshold is set to a value larger than the first threshold that the first detection unit 12 uses for detecting the speech section (such as 0.3). Alternatively, the threshold adjustment unit 24 may set the initial value of the second threshold.

Next, when the first voice signal is transmitted from the client device 10, the first voice signal is received by the communication unit 21 and is passed to the second detection unit 22 (step S203). The second detection unit 22 then detects the speech section in the first voice signal received from the client device 10, using the above method, for example (step S204). The second voice signal that is a signal in the speech section detected by the second detection unit 22 is passed to the voice recognition unit 23.

Next, the voice recognition unit 23 performs voice recognition on the second voice signal that is received from the second detection unit 22 (step S205). The recognition result of the voice recognition unit 23 is transmitted to the client device 10 from the communication unit 21, via the communication network 30 (step S206).

Next, the threshold adjustment unit 24 adjusts the second threshold using the above method, based on the recognition result of the voice recognition unit 23, for example (step S207).

Then, when a threshold inquiry is transmitted from the client device 10, the threshold inquiry is received by the communication unit 21, and is passed to the threshold adjustment instruction unit 27 (step S208). Upon receiving the threshold inquiry, the threshold adjustment instruction unit 27 first requests the time ratio calculation unit 26 to calculate the time ratio. The time ratio calculation unit 26 then calculates the time ratio between the first voice signal and the second voice signal, according to the request (step S209).

Next, the threshold adjustment instruction unit 27 acquires the time ratio calculated by the time ratio calculation unit 26, and calculates a proper value of the first threshold based on the time ratio, using the above method, for example (step S210). The proper value of the first threshold that is calculated by the threshold adjustment instruction unit 27 is transmitted with the instruction for adjusting the threshold, to the client device 10 from the communication unit 21, via the communication network 30 (step S211). The proper value of the first threshold is also stored in the storage unit 28 in association with the attribute information of the client device 10 (step S212).

Then, while the client device 10 is being connected (Yes at step S213), the processes from step S203 to step S212 are repeated. When the client device 10 is disconnected (No at step S213), the series of processes illustrated in the flowchart of FIG. 6 are completed.

As described in detail above using specific examples, in the voice recognition system according to the present embodiment, the client device 10 roughly detects the speech section in the input signal and transmits the first voice signal to the server device 20, and the server device 20 strictly detects the speech section in the first voice signal and performs the voice recognition on the acquired second voice signal. Consequently, according to the present embodiment, it is possible to perform highly accurate and efficient voice recognition that accurately detects the speech section, while reducing the communication volume between the client device 10 and the server device 20.

The voice recognition system of the present embodiment has a function that can make the likelihood being calculated at the client device 10 side approximate the likelihood being calculated at the server device 20 side. Consequently, it is possible to adjust the detection accuracy of the speech section using a threshold as a common index, while detecting the speech section using different methods between the client device 10 side and the server device 20 side. In other words, in the client device 10 side with the limited resources, the speech section is detected by using a method with a relatively small arithmetic processing load. In the server device 20 side, the speech section is strictly detected using a method with a larger arithmetic processing load than that of the client device 10.

The voice recognition system of the present embodiment also has a function of adjusting the first threshold that is used for detecting the speech section in the client device 10 side, and a function of adjusting the second threshold that is used for detecting the speech section in the server device 20 side. Consequently, it is possible to optimize the relation between the speech section detected in the client device 10 side and the speech section detected in the server device 20 side, by repeating the process each time.

Second Embodiment

Another configuration example of the client device 10 will now be described as a second embodiment. In the following, to differentiate the client device 10 of the second embodiment from that of the first embodiment, the client device 10 of the second embodiment will be referred to as a client device 10A. The configuration of the server device 20 is the same as that in the first embodiment. Hereinafter, the same reference numerals denote the same components as those in the first embodiment to omit the detailed description thereof, and only the differences from the first embodiment will be described.

Figure 7:
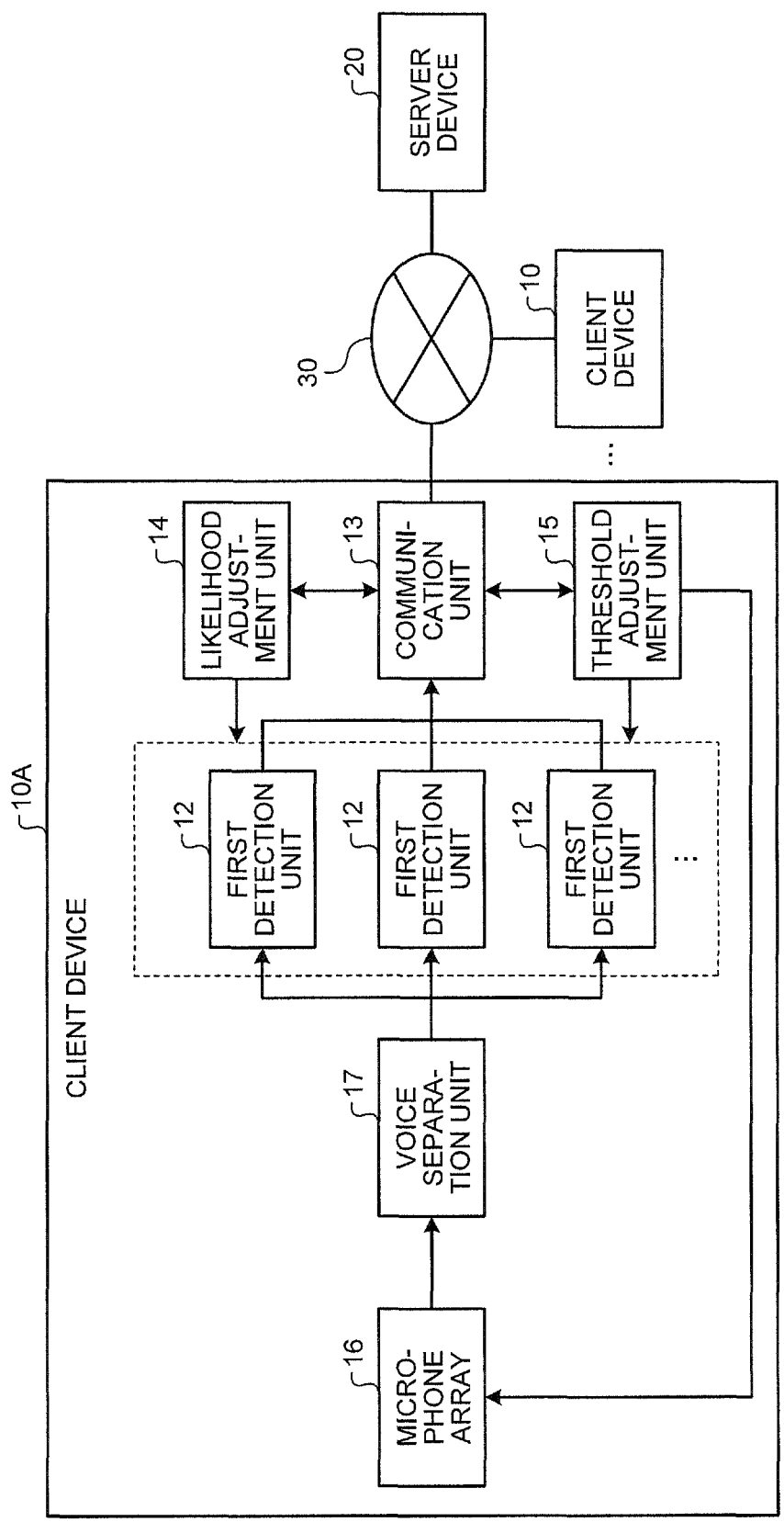
FIG. 7 is a block diagram illustrating another configuration example of the client device.

FIG. 7 is a block diagram illustrating a configuration example of the client device 10A of the second embodiment. The client device 10A in the second embodiment is configured under the assumption that the client device 10A is used and shared by a plurality of users, such as a television conference terminal. Instead of the microphone 11 in the client device 10 of the first embodiment, the client device 10A of the second embodiment includes a microphone array 16 in which a plurality of microphones are integrated. The microphone array 16 receives a signal including speech of a plurality of speakers.

The client device 10A of the second embodiment further includes a voice separation unit 17 (separation unit) in addition to the configuration of the client device 10 of the first embodiment. The voice separation unit 17 separates an input signal received by the microphone array 16, into signals for respective speakers. Specifically, the voice separation unit 17 estimates the direction of a sound source (speaker) from the input signal that is received by the microphone array 16. If the voice separation unit 17 estimates that there is a plurality of directions in the sound source, the voice separation unit 17 separates the input signal into signals for the respective sound sources. Because the technology of estimating the direction of the sound source and separating the signal as the above is a known technology, the detailed description thereof will be omitted.

The voice separation unit 17 dynamically generates the first detection unit 12 for detecting the speech section, for each of the signals that are separated for the respective sound sources (speakers). In other words, when it is determined that there is a sound source (speaker) in a certain direction, from the input signal received by the microphone array 16, the voice separation unit 17 generates the first detection unit 12 for detecting the speech section, for the signal from the sound source. When it is determined that there is a sound source (speaker) in another direction, the voice separation unit 17 generates the first detection unit 12 for detecting the speech section, for the signal from the sound source. The signals that are separated for the respective sound sources (speakers) are respectively passed to the first detection units 12 having been dynamically generated, and hereinafter, the same process as that in the first embodiment will be performed. The first detection unit 12 that is dynamically generated for each sound source (speaker) is deleted, when a signal is not received from the direction of the sound source (speaker) over a predetermined period of time.

Similar to the first embodiment, in the client device 10A, the likelihood adjustment unit 14 adjusts the likelihood, and the threshold adjustment unit 15 adjusts the first threshold. However, the likelihood adjustment and the threshold adjustment are performed individually on the first detection unit 12 that is dynamically generated for each sound source (speaker). The process in the server device 20 is also performed individually on the signal that is separated for each sound source (speaker).

As described above, in the present embodiment, the client device 10A separates the input signal for each of the speakers, and dynamically generates the first detection unit 12. Thus, similar to the first embodiment, it is possible to perform highly accurate and efficient voice recognition that accurately detects the speech section, while reducing the communication volume between the client device 10A and the server device 20. In addition, it is also possible to individually perform the voice recognition on the speech of the speakers, and obtain the recognition result for each of the speakers.

Supplement

Each of the functional components in the server device 20 of the embodiment described above, for example, can be implemented using a computer program (software) that is executed by a general-purpose computer system as basic hardware.

Figure 8:
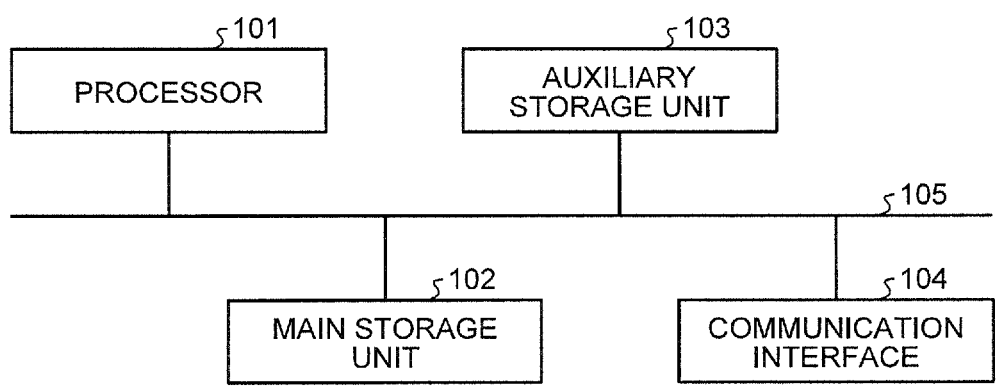
FIG. 8 is a schematic block diagram of an example of a hardware configuration of the server device.

FIG. 8 is a schematic block diagram of an example of a hardware configuration of the server device 20. As illustrated in FIG. 8, the server device 20 is configured as a general-purpose computer system including a processor 101 such as a central processing unit (CPU), a main storage unit 102 such as a random access memory (RAM), an auxiliary storage unit 103 that uses various types of storage devices, a communication interface 104, and a bus 105 that connects each of the units. The auxiliary storage unit 103 may also be connected to each of the units through a local area network (LAN) either wired or wireless.

For example, the functional components of the server device 20 are implemented, when the processor 101 executes the computer program stored in the auxiliary storage unit 103 and the like, by using the main storage unit 102. For example, the computer program is provided as a computer program product, by being recorded on a computer-readable recording media such as a compact disc-read only memory (CD-ROM), a flexible disc (FD), a compact disc-recordable (CD-R), a digital versatile disc (DVD), and the like, in an installable or executable file format.

The computer program may also be stored in another computer that is connected to a network such as the Internet, and provided by being downloaded via the network. The computer program may also be provided or distributed via a network such as the Internet. The computer program may also be provided while being incorporated in the ROM (auxiliary storage unit 103) or the like inside the computer in advance.

The computer program has a modular configuration including the functional components (the communication unit 21, the second detection unit 22, the voice recognition unit 23, the threshold adjustment unit 24, the likelihood adjustment instruction unit 25, the time ratio calculation unit 26, and the threshold adjustment instruction unit 27) of the server device 20. For example, as actual hardware, the processor 101 reads out the computer program from the storage media described above and executes the computer program, whereby the components described above are loaded on the main storage unit 102, and the components described above are generated on the main storage unit 102. A part or all of the functional components of the server device 20 may also be implemented using exclusive hardware such as an application specific integrated circuit (ASIC) and a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech section detection device comprising:
processing circuitry configure to function as:
a reception unit configured to receive, from an external device, a first voice signal that is a signal in which likelihood indicating a probability of speech is equal to or more than a first threshold; and
a detection unit configured to detect, from the first voice signal, a second voice signal that is a signal of a section in which the likelihood is equal to or more than a second threshold that is larger than the first threshold, wherein
the external device calculates the likelihood using a first method; and
the detection unit calculates the likelihood using a second method that is different from the first method, wherein
the processing circuitry is further configured to function as a likelihood adjustment instruction unit configured to instruct the external device to adjust the likelihood so that the likelihood to be calculated by the first method approximates the likelihood to be calculated by the second method.

2. The device according to claim 1, wherein the likelihood adjustment instruction unit transmits, to the external device, a sampled signal and time series data of the likelihood that is calculated by the detection unit for the sampled signal using the second method, and instructs the external device to adjust the likelihood so that the likelihood to be calculated for the sampled signal in a time series manner by the first method approximates the time series data.

3. The device according to claim 1, wherein the processing circuitry is further configured to function as a voice recognition unit configured to perform a voice recognition on the second voice signal and output text data corresponding to the second voice signal.

4. The device according to claim 3, wherein the processing circuitry is further configured to function as a threshold adjustment unit configured to adjust the second threshold, based on a recognition result of the voice recognition unit.

5. A speech section detection device comprising:
processing circuitry configure to function as:
a reception unit configured to receive, from an external device, a first voice signal that is a signal in which a likelihood indicating a probability of speech is equal to or more than a first threshold;
a detection unit configured to detect, from the first voice signal, a second voice signal that is a signal of a section in which the likelihood is equal to or more than a second threshold that is larger than the first threshold;
a time ratio calculation unit configured to calculate a time ratio between the first voice signal and the second voice signal; and
a threshold adjustment instruction unit configured to calculate a proper value of the first threshold based on the time ratio, and to instruct the external device to adjust the first threshold to the proper value.

6. The device according to claim 5, wherein
the external device detects the first voice signal from a signal received by using a microphone, and
when the proper value that is calculated based on the time ratio exceeds a reference range, the threshold adjustment instruction unit instructs the external device to adjust sensitivity of the microphone.

7. The device according to claim 5, wherein
the external device detects the first voice signal from a signal received by using a microphone, and
when the proper value that is calculated based on the time ratio exceeds a reference range, the threshold adjustment instruction unit transmits, to the external device, a warning indicating that an input of the signal using the microphone is not properly performed.

8. The device according to claim 5, further comprising:
a storage device configured to store therein the proper value that is calculated for the external device in association with attribute information of the external device, wherein
the threshold adjustment instruction unit instructs another external device having an attribute similar to the attribute information stored in the storage unit, to set the proper value that is associated with the attribute information as the first threshold.

9. A voice processing system comprising:
a first device; and
a second device that communicates with the first device via a network,
the first device comprising:
first processing circuitry configure to function as:
a first detection unit configured to detect, from an input signal, a first voice signal that is a signal of a section in which likelihood indicating a probability of speech calculated by using a first method is equal to or more than a first threshold; and
a transmission unit configured to transmit the first voice signal to the second device, and
the second device comprising:
second processing circuitry configure to function as:
a reception unit configured to receive the first voice signal; and
a second detection unit configured to detect, from the first voice signal, a second voice signal that is a signal of a section in which the likelihood calculated by using a second method that is different from the first method is equal to or more than a second threshold that is larger than the first threshold; and
a likelihood adjustment instruction unit configured to instruct the first device to adjust the likelihood so that the likelihood to be calculated by the first method approximates the likelihood to be calculated by the second method.

10. The system according to claim 9, wherein
the input signal includes speech of a plurality of speakers,
the first processing circuitry is further configured to function as a separation unit configured to separate the input signal to signals for respective speakers of the plurality of speakers, and
the first detection unit is dynamically generated for the signals that are separated for the respective speakers.

11. A speech section detection method executed by a computer, the method comprising:
receiving, from an external device, a first voice signal that is a signal in which likelihood indicating a probability of speech is equal to or more than a first threshold; and
detecting, from the first voice signal, a second voice signal that is a signal of a section in which the likelihood is equal to or more than a second threshold that is larger than the first threshold, wherein
the external device calculates the likelihood using a first method; and
the detecting calculates the likelihood using a second method that is different from the first method, wherein
the method further comprises
instructing the external device to adjust the likelihood so that the likelihood to be calculated by the first method approximates the likelihood to be calculated by the second method.

12. A computer program product comprising a non-transitory computer-readable medium including programmed instructions that cause a computer to implement:
a function of receiving, from an external device, a first voice signal that is a signal in which likelihood indicating a probability of speech is equal to or more than a first threshold; and
a function of detecting, from the first voice signal, a second voice signal that is a signal of a section in which the likelihood is equal to or more than a second threshold that is larger than the first threshold, wherein
the external device calculates the likelihood using a first method; and
the function of detecting calculates the likelihood using the second method that is different from the first method, wherein
the programmed instructions further cause the computer to implement a function of instructing the external device to adjust the likelihood so that the likelihood to be calculated by the first method approximates the likelihood to be calculated by the second method.

\* \* \* \* \*